US008277589B2

(12) United States Patent
Gallego et al.

(10) Patent No.: US 8,277,589 B2
(45) Date of Patent: Oct. 2, 2012

(54) METHOD OF RETREADING A TIRE

(75) Inventors: Juan-Pablo Gallego, Samut Prakan (TH); Nathan J. Panning, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 475 days.

(21) Appl. No.: 12/446,479

(22) PCT Filed: Nov. 29, 2006

(86) PCT No.: PCT/US2006/045726
§ 371 (c)(1),
(2), (4) Date: Apr. 21, 2009

(87) PCT Pub. No.: WO2008/066527
PCT Pub. Date: Jun. 5, 2008

(65) Prior Publication Data
US 2010/0186858 A1 Jul. 29, 2010

(51) Int. Cl.
B29D 30/56 (2006.01)
(52) U.S. Cl. .................. 156/96; 152/209.6; 152/209.17; 152/209.21; 264/239; 425/28.1
(58) Field of Classification Search ............. 152/209.15, 152/209.17, 209.21, 209.6; 156/96, 110.1; 264/239; 425/28.1
See application file for complete search history.

(56) References Cited

U.S. PATENT DOCUMENTS

| 3,970,131 | A | * | 7/1976 | Schelkmann | ............... | 152/209.6 |
|---|---|---|---|---|---|---|
| 4,934,426 | A | | 6/1990 | Remond et al. | | |
| 5,503,208 | A | | 4/1996 | Kamegawa et al. | | |
| 5,536,348 | A | | 7/1996 | Chlebina et al. | | |
| 5,603,366 | A | | 2/1997 | Nakayama et al. | | |
| 6,386,253 | B1 | | 5/2002 | Marriott | | |
| 6,439,284 | B1 | | 8/2002 | Fontaine | | |
| 6,554,034 | B1 | | 4/2003 | Minami | | |
| 2003/0101851 | A1 | | 6/2003 | Domange et al. | | |
| 2004/0045649 | A1 | | 3/2004 | Lopez et al. | | |
| 2004/0256041 | A1 | | 12/2004 | Ratliff, Jr. | | |
| 2005/0150582 | A1 | | 7/2005 | Matsumura | | |
| 2009/0205762 | A1 | * | 8/2009 | Mayni et al. | ............... | 156/110.1 |

FOREIGN PATENT DOCUMENTS

| JP | 03-153406 A | 7/1991 |
|---|---|---|
| JP | 06-135206 A | 5/1994 |
| JP | 07-257111 A | 10/1995 |
| JP | 09-070903 A | 3/1997 |
| JP | 2000-102925 A | 4/2000 |

OTHER PUBLICATIONS

International Search Report and Written Opinion, PCT/US2006/045726, dated Jun. 13, 2007.

* cited by examiner

*Primary Examiner* — Steven D Maki
(74) *Attorney, Agent, or Firm* — Hahn Loeser & Parks LLP; Bret A. Hrivnak, Esq.

(57) ABSTRACT

A mold (150) for a tread layer (40) having tread-forming side and sole-forming side, the sole-forming side having a plurality of mold elements (56) extending therefrom toward the tread-forming side. Either the mold elements (56) or the sole-forming side of the mold is configured to create a tread layer (40) having a recessed tread element such as an incision, lateral groove, longitudinal groove or other void on the sole side of the tread layer that enables the edges of the recessed tread element to obtain full coverage when subjected to an abrasion process.

13 Claims, 7 Drawing Sheets

METHOD OF RETREADING A TIRE

BACKGROUND OF THE INVENTION

1. Field of the Invention

The present invention is in the field of re-treaded tires.

2. Description of the Related Art

When tires become worn, they can be restored with new tread band or tread layer. Large truck tires are typically retreaded as part of a routine tire-management program. The carcass of a truck tire is expected to last several hundred thousand miles and be amenable to having a new tread layer adhered to it several times. New truck tires are quite expensive and are therefore bought with the expectation that their high initial costs are offset by the long service life of the carcass and the low comparative cost of retreading.

A variety of procedures and different types of equipment are available for use in recapping or retreading pneumatic tires. One of the first steps in retreading a worn tire is to remove existing tread layer material from the tire carcass by a sanding procedure known as buffing. Next a layer of what is known as "cushion gum" is applied to the carcass. This layer of extruded, uncured rubber may be stitched or adhesively bonded to the carcass. Next, a tread layer is applied atop the layer of cushion gum. In the cold recapping process, the tread layer is cured rubber, and has a tread pattern already impressed in its outer surface. The tire is then placed in an autoclave, and heated under pressure for an appropriate time to induce curing of the gum layer, and binding of the gum layer to the inner or sole side of the tread layer and the carcass. The term "cure" refers to the formation of cross-links between the elastomer molecules in the rubber compound. It is further noted that there are various methods of bonding the tread layer to the carcass such as the use of adhesives, bonding agents, cushion gums, etc., and that all of the methods. known in the art are included when referring to the term "bonding interface".

A common problem with tires, including retreads, is that as the tire wears, the traction-providing elements also wear, until eventually the elements are substantially worn away. The result can be a significant reduction in traction for the worn tire. Efforts have been made to develop a tread layer that has tread elements cut into the sole side (the side facing the cushion gum layer) of the tread layer. The term "tread elements" refers to incisions, lateral grooves, and/or longitudinal grooves or any other void formed in the tread layer. The term "mold elements" are the parts of the mold that create the tread elements in the tread layer, such as for example a fin. Tread elements molded into the sole side of the tread layer appear as the tire wears, giving improved worn traction over the life of the retread and allowing the tire to be removed from service later in life.

SUMMARY OF THE INVENTION

A particular embodiment of the present invention includes a tread layer for a tire, the tread layer comprising: a tread layer body having a tread side and a sole side; a plurality of recessed tread elements molded from the sole side of the tread body; wherein the plurality of recessed tread elements each has a protrusion extending from a first inner surface of the recessed tread element toward an opposing surface of the tread element.

Another particular embodiment of the present invention includes a tread layer for a tire, the tread layer comprising: a tread layer body having a tread side and a sole side; a plurality of protrusions extending from the sole side of the tread layer, wherein the recessed tread elements each abut at least one of the protrusions.

Another particular embodiment of the present invention includes a method of molding a tread layer comprising the steps of: molding a tread surface on a tread side of the tread layer; molding a plurality of recessed tread elements from a sole side of the tread layer; molding a plurality of protrusions extending from the sole side of the tread layer, wherein the recessed tread elements each abut at least one of the protrusions.

Another particular embodiment of the present invention includes a mold for curing a tread layer comprising: a first side of the mold having a tread-forming surface; a second side of the mold having a sole-forming surface; wherein the second side of the mold comprises a plurality of mold elements extending from the sole-forming surface toward the first side of the mold; wherein the second side of the mold has at least one recess in the sole-forming surface abutting the at least one mold element.

Another particular embodiment of the present invention includes a mold for curing a tread layer comprising: a first side of the mold having a tread-forming surface; a second side of the mold having a sole-forming surface; wherein the second side of the mold comprises a plurality of mold elements extending therefrom toward the first side of the mold; at least a portion of at least one mold element having a variable cross-sectional thickness.

Another particular embodiment of the present invention includes a mold for curing a tread layer comprising: a first side of the mold having a tread-forming surface; a second side of the mold having a sole-forming surface; wherein the second side of the mold comprises a plurality of mold elements extending therefrom toward the first side of the mold and wherein the second. side of the mold has at least one recess in the sole-forming surface abutting the at least one mold element.

These and other advantages will be apparent upon a review of the detailed description of the invention.

DETAILED DESCRIPTION OF THE DRAWINGS

Figure 1:
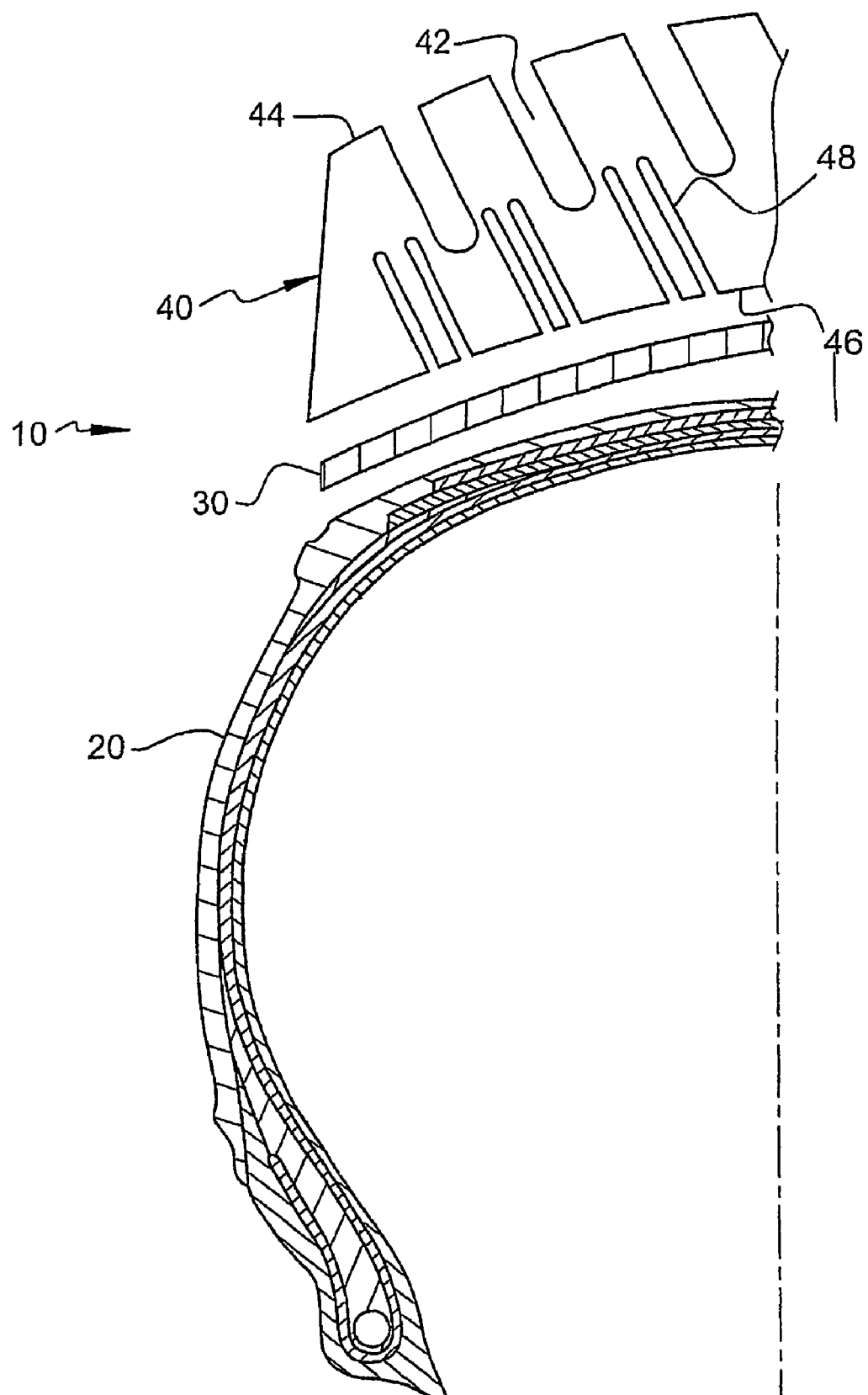
FIG. 1 shows a partial cross-sectional view of a retread tire having recessed tread elements formed from the sole side of the tread layer in accordance with one embodiment of the invention.

Referring now to FIG. 1, a partially exploded axial section of a retread tire 10 is shown comprising a tire carcass 20, a cushion layer 30, and a tread layer 40 in accordance with a first embodiment of the invention. The tread layer 40 comprises a band of cured rubber having a tread pattern 42 formed in its outer surface 44. A plurality of recessed tread elements 48 are also shown formed in the inner surface 46, or sole side surface, of the tread layer 40. These recessed tread elements 48 formed in the sole side surface of the tread layer 40 are molded into the tread layer from the sole side. The cushion layer 30 is positioned between the ready-to-retread tire carcass 20 and the tread layer 40. Once these elements are assembled under normal retread procedures, the tire 10 is then placed in an autoclave, and heated under pressure for an appropriate time to induce curing of the cushion layer 30, and binding of the cushion layer 30 to the sole side surface 46 of the tread layer 40 and the tire carcass 20. In the embodiment shown, the width of the tread side 44 is narrower than the width of the sole side 46, It is noted that, in the examples described herein, a cushion layer 30 is used between the carcass 20 and the tread layer 40. This is for example only and is not intended to be limiting on the invention. It is contemplated that the any type of bonding interface can be used between the tread layer 40 and the tire carcass 20; e.g., adhesives.

Figure 2:
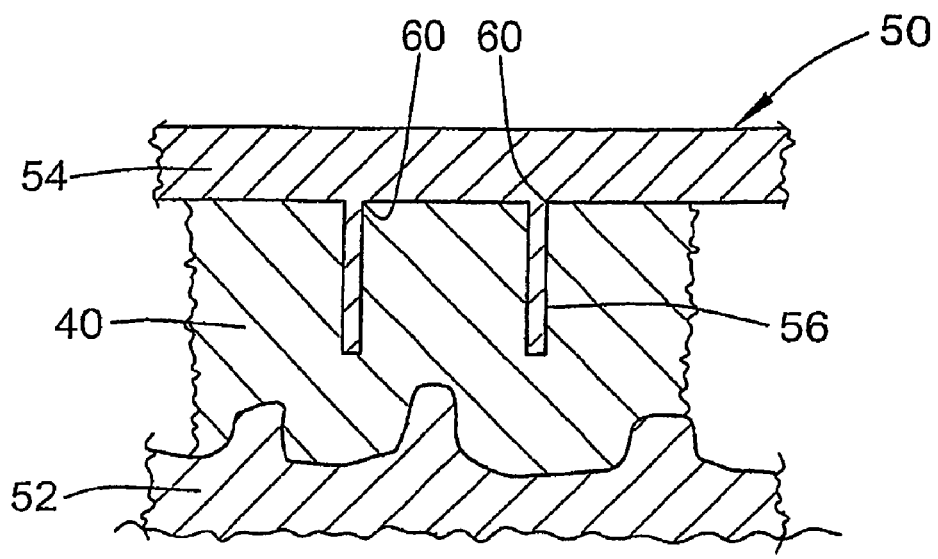
FIG. 2 shows a partial cross-sectional view of a tread layer mold for forming recessed tread elements in the sole side of the tread layer.

The production of the tread layer 40 is shown in FIG. 2, Mold 50 has a first side or tread impression side 52 for forming the tread pattern 42 in the outer surface 44 of the tread layer 40 and a second side or interior side 54 for forming the sole side 46 of the tread layer 40. The interior side 54 comprises mold elements 56, shown herein as fins, for forming tread elements 48 in the sole side 46 of the tread layer 40. In forming a tread where the width of the tread side is narrower than the width of the sole side, such in FIG. 1, with regards to the mold for forming such a tread, the mold includes a tread forming surface for forming the tread side of the tread and a sole-forming surface for forming the sole side of the tread such that the width of the tread-forming surface is narrower than the width of the sole-forming surface.

Figure 3:
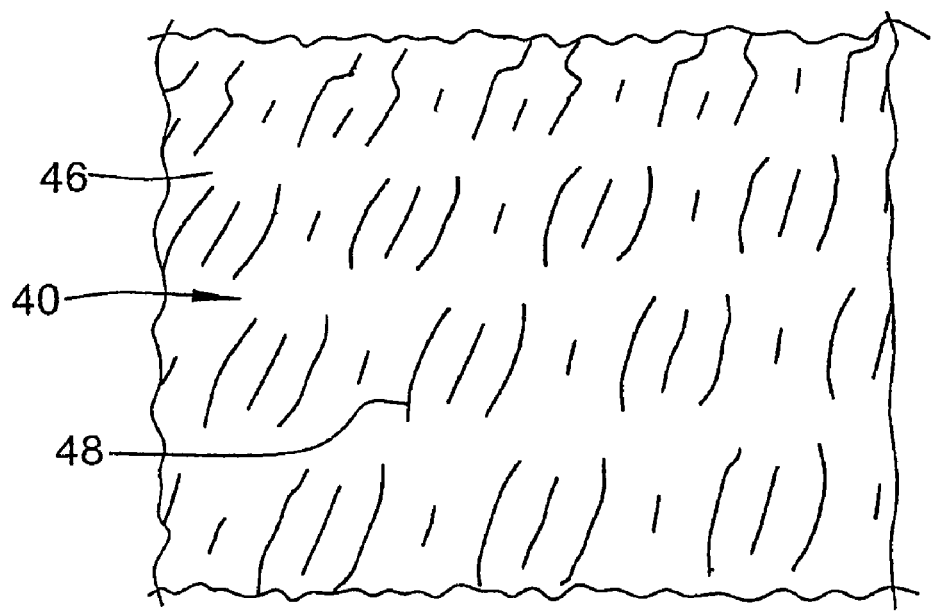
FIG. 3 shows a top view of a the sole side of the tread layer of FIG. 2 having a plurality of recessed tread elements formed therein.

When the tread layer 40 is removed from the mold 50 as shown in FIG. 3, the recessed tread elements 48 are visible in the sole side surface 46. Referring back to FIG. 2, it is noted that the mold elements 56 may be perpendicular to the sole side surface 46 and that corners 60 are formed at the interface of the sole side surface 46 and the recessed tread elements 48. The mold elements 56 may also be transverse to the sole side surface 46; however, angled corners will still be formed.

Although not shown, the sole side surface 46 is typically covered with mold release agents upon removal of the tread layer 40 from the mold 50. Accordingly, the sole side surface 46 must be treated to remove the release agents from the surface. One such treatment method involves adding a texture to the sole side surface 46.

Figure 4:
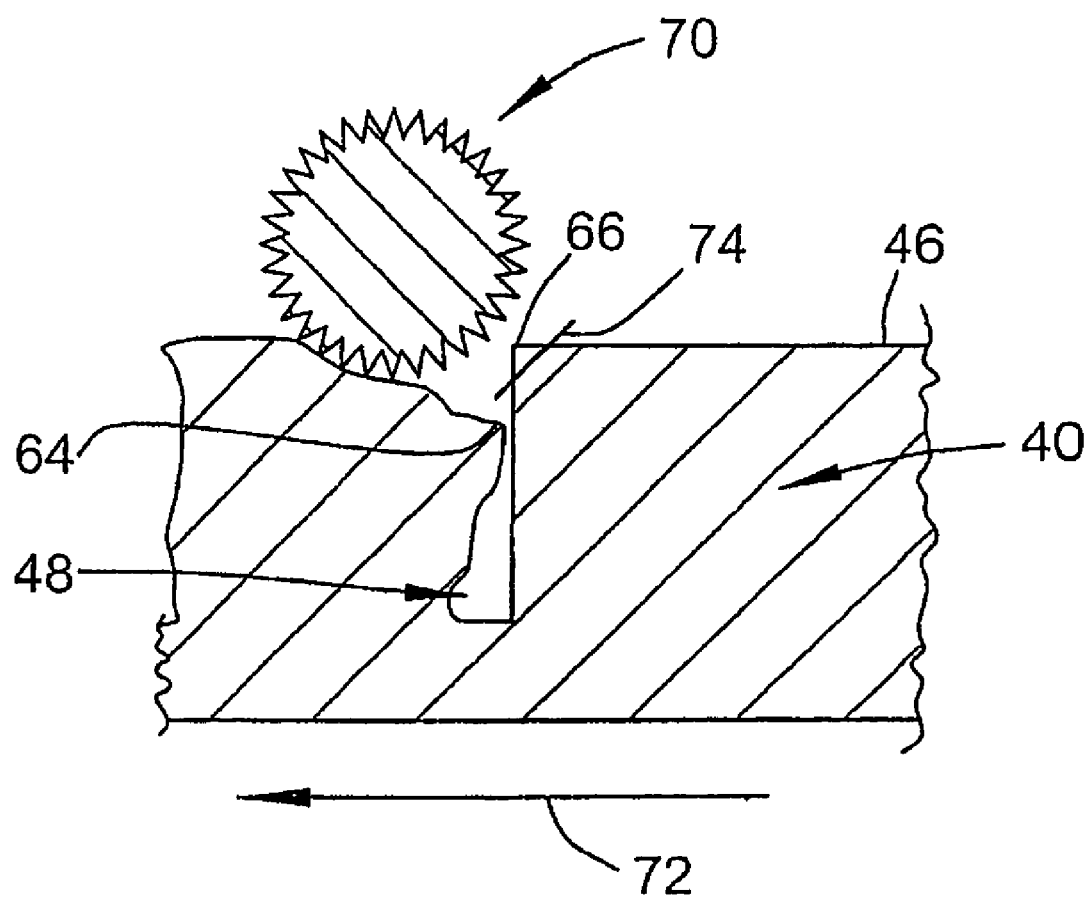
FIG. 4 shows a cross-sectional view of an abrasion system operation providing a surface texture to the sole side of the tread layer of FIG. 2.

Referring now to FIG. 4, a rotating abrasion system 70 is shown providing a surface texture to the sole side 46 of the tread layer 40. The abrasion system 70 may include, for example, a grinding wheel or wire brush. The tread layer 40 moves in a single direction 72 past the fixed abrasion system 70. However, the recessed tread elements 48 (shown herein as a sipe or incision) create a problem with abrasion system 70 in that the first edge 64 or leading edge of the recessed tread element 48 pushes away from the abrasion system 70. The second edge 66 or trailing edge of the recessed tread element 48 is textured as marked at element 74.

Figure 5:
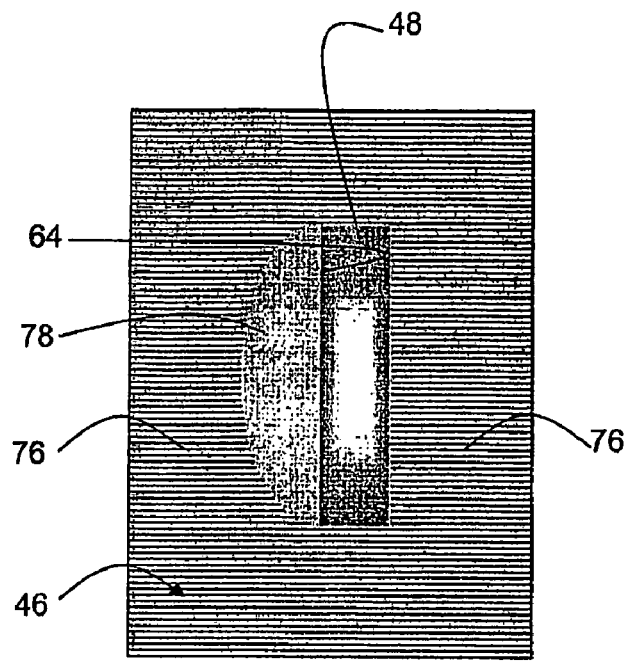
FIG. 5 shows a schematic plan view of the results of the texture formed on the recessed tread elements of the sole side of the tread layer by the abrasion system operation of FIG. 4.

The result is best shown in FIG. 5 which shows a plan view of the texture 76 formed abutting the recessed tread elements 48 of the sole side 46 of the tread layer 40 by the abrasion system operation of FIG. 4. As shown in FIG. 5, a portion of the sole side surface 78 generally abutting the first edge 64 of the recessed tread element 48 may not be roughened by the abrasion system 70 and may still be covered with mold release agent. Either of these factors may result in poor bonding of the tread layer 40 and limit the endurance of the retreaded tire 10.

Figure 7:
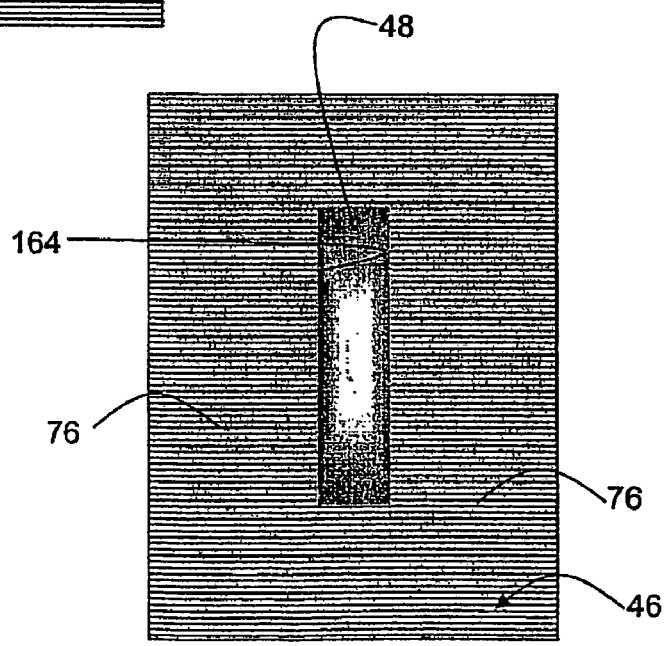
FIG. 7 shows a schematic plan view of the results of the texture formed on the recessed tread elements of the sole side of the tread layer formed in accordance with FIG. 6 by the abrasion system operation of FIG. 4.
Figure 6:
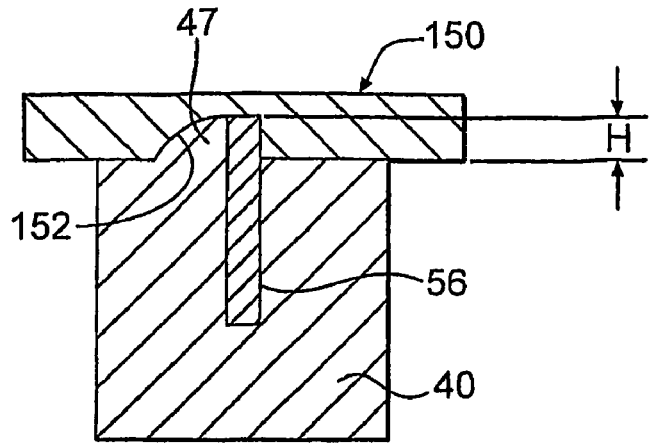
FIG. 6 shows a partial cross-sectional view of a tread layer mold in accordance with another embodiment of the present invention for forming a raised area on one side of the recessed tread elements in the sole side of the tread layer.

In order to improve the endurance of the retreaded tire 10 the sole side of the tread layer should be completely roughened. Referring now to FIG. 6, a mold 150 is used to form the recessed tread elements 48 in a manner allowing full surface treatment. Mold 150 comprises a recess 152 on a first side or leading side of each mold element 56 for forming recessed tread elements in the sole side 46 of the tread layer 40. This creates an elevated bump or protrusion 47 on one side of the tread element. When the tread layer 40 is removed from the mold 150 and subjected to the abrasion system 70, the tread layer 40 is positioned such that the elevated bump 47 is the first edge or leading edge with relation to the abrasion system 70. While the elevated bump 47 will still push away slightly from the abrasion system 70, the elevated height, H, ensures that the surface adjacent the leading edge 164 is fully treated as best shown in FIG. 7.

Figure 8:
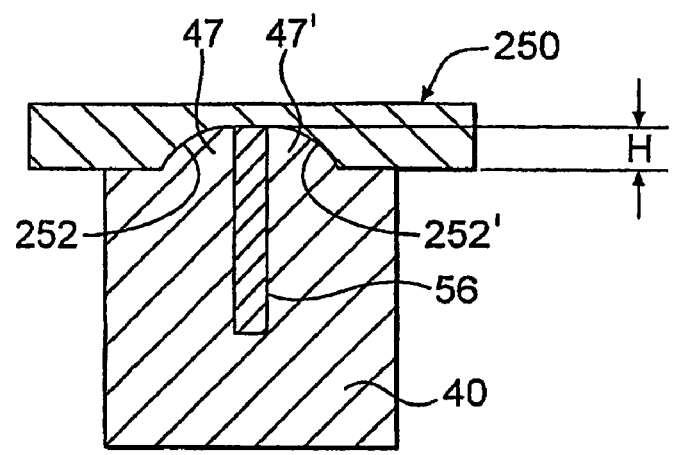
FIG. 8 shows a partial cross-sectional view of a tread layer mold in accordance with an embodiment of the present invention for forming a raised area on two sides of the recessed tread elements in the sole side of the tread layer.
Figure 9:
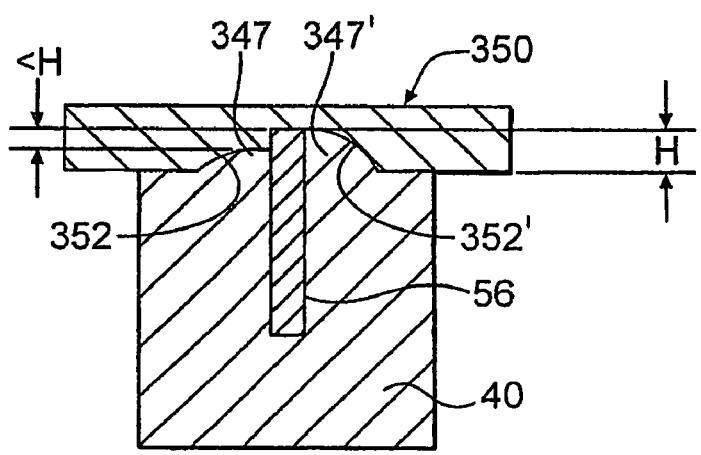
FIG. 9 shows a partial cross-sectional view of a tread layer mold in accordance with still another embodiment of the present invention for forming a raised area on two sides of the recessed tread elements in the sole side of the tread layer, with each raised area having different heights.

Other embodiments of the mold 250, 350 and corresponding tread layer 40 are shown in FIGS. 8 and 9. In these embodiments, the mold comprises a recess on either side of each mold element 56. In FIG. 8, the recesses 252, 252' are symmetrical to the mold element 56 whereas in FIG. 9, one recess 352' is larger than the other recess 352 to create bumps 347', 347 of different heights and shapes, respectively. The depth of the recess/height H of the bump 47, 47', 347, 347' is generally less than 1 mm to provide full coverage of the treatment, however the invention is not limited to a specific height. The optimum height of the bumps is generally a function of the softness of the tread rubber. Particular embodiments of the invention include non-limiting ranges for the height H of at least 0.2 or at least 0.4 mm to about 2.5 mm or to about 5 mm or alternatively of between at least 0.4 mm and 2 mm or between 0.5 mm and 1.5 mm.

While the exemplary embodiments described and shown herein include bumps or protrusions having a rounded shape, the invention is not meant to be limited to such shapes as the shape may include any suitable shape including, for example, triangular, rectangular, oval or parts of these shapes.

Figure 10:
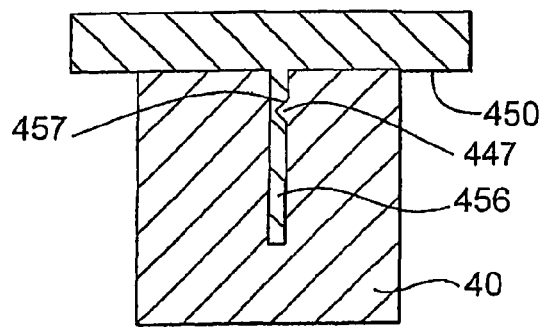
FIG. 10 shows a partial cross-sectional view of a tread layer mold in accordance with still another embodiment of the present invention wherein the mold forms a variable thickness in the recessed tread element.
Figure 11:
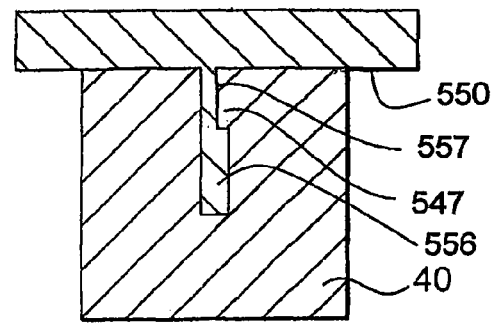
FIG. 11 shows a partial cross-sectional view of a tread layer mold in accordance with still another embodiment of the present invention wherein the mold forms a variable thickness in the recessed tread element.
Figure 12:
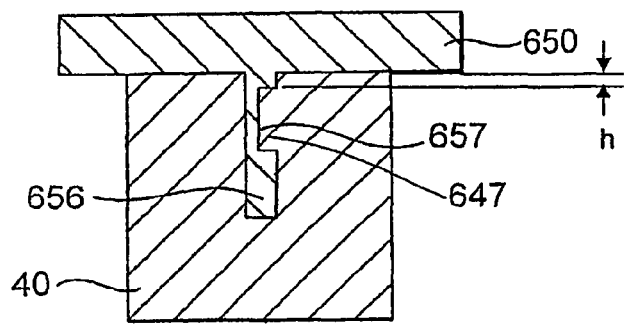
FIG. 12 shows a partial cross-sectional view of a tread layer mold in accordance with still another embodiment of the present invention wherein the mold forms a variable thickness in the recessed tread element.
Figure 13:
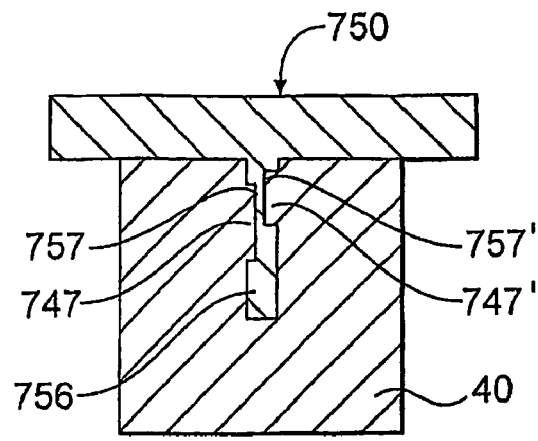
FIG. 13 shows a partial cross-sectional view of a tread layer mold in accordance with still another embodiment of the present invention wherein the mold forms another configuration of a variable thickness in the recessed tread element.
Figure 14:
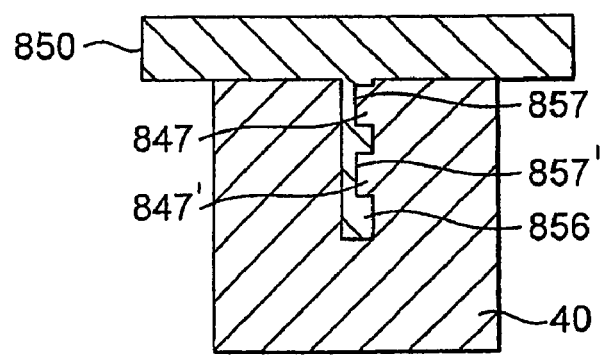
FIG. 14 shows a partial cross-sectional view of a tread layer mold in accordance with an embodiment of the present invention wherein the mold forms still another configuration of a variable thickness in the recessed tread element.

In the previous embodiments, recesses were formed in the mold surface to ensure complete roughening treatment of the sole side surface having recessed tread elements. In the next embodiments of FIGS. 10-14, complete treatment is achieved by modifications made to the mold elements rather than the mold surface. FIG. 10 shows a mold 450 with a mold element 456 having a generally triangular or pointed recess 457 in one side of the mold element 456. FIG. 11 shows a mold 550 with a mold element 656 having a recess 657 formed in one side thereof wherein one side of the recess 657 is tangent to the mold surface. In FIG. 12, a mold 650 is shown with a mold element 656 also having a recess 657 formed in one side thereof. However, recess 657 is spaced a distance, h, from the mold surface. It is noted that the distance, h, is typically less than 1 mm and more particularly less than 0.5 mm as will be discussed in more detail below. In FIG. 13, a mold 750 is shown with a mold element 756 having a recess 757, 757' formed in both sides thereof wherein one recess 757 is larger and offset from recess. 757'. It is also contemplated that the recesses 757, 757' can be the same size and symmetrical to each other. In FIG. 14, a mold 850 is shown with a mold element 856 having a recess 857, 857' formed in one side thereof. It is also contemplated that the recesses 857, 857' can be the same or different sizes or symmetrical with respect to their positioning along the length of the mold element 856.

These configurations of mold elements 456, 556, 656, 756, 856 result in blocking material as protrusions 447, 547, 647, 747, 747', 847 in the recessed tread element inner wall that prevent an edge from deflecting (e.g., as best seen in FIG. 4, edge 64) during the abrasion process. Accordingly, the protrusions are typically formed at or near the sole surface at a distance, h, of 0 mm to 1 mm from the sole surface, although the invention is not intended to be limited to such a range. The purpose of the blocking material is not to reinforce the tread blocks but instead prevents an edge of the recessed tread element from deflecting during the abrasion process. The blocking protrusions can be of a single continuous geometry or of a plurality of smaller geometries and of any suitable shape. The blocking protrusions can also extend downward into the recessed tread element and also across the recessed tread element in the width direction.

All shapes and geometries of the protrusions are acceptable as long as the protrusions can be pushed against an opposing wall during the abrasion process to prevent the recessed tread element edge from deflecting. As illustrated above, the opposing wall may be an opposing wall of the recessed tread element or an opposing wall of another protrusion from the recessed tread element wall, as best seen in FIG. 13. Furthermore, the protrusions 747 and 747' may illustrate an embodiment wherein the longer protrusion 747, which extends well into the depth of the recessed tread element, may be provided for rigidity while the shorter protrusion 747' is provided to prevent the edge of the recessed tread element from deflecting during the abrasion process, such deflection occurring when the shorter protrusion 747' is pushed against the longer protrusion 747.

While this invention has been described with reference to preferred embodiments thereof, it shall be understood that such description is by way of illustration and not by way of limitation. Accordingly, the scope and content of the present invention are to be defined only by the terms of the appended claims.

What is claimed is:

1. A method of retreading a tire comprising the steps of:
   providing a tread layer for a tire, the tread layer including:
      a tread layer body having a tread side and a sole side, wherein the width of the tread side is narrower than the width of the sole side;
      a plurality of recessed tread elements molded from the sole side of the tread layer, a plurality of protrusions extending outwardly from the sole side of the tread layer away from the tread side, wherein the recessed tread elements each abut at least one of the protrusions;
   roughening the sole side of the tread layer; and,
   bonding the sole side of the tread layer to a tire carcass after roughening the sole side of the tread layer.

2. The method of claim 1, wherein at least a portion of the plurality of recessed tread elements abut at least two of the protrusions, the protrusions opposed one to the other across an opening of the recessed tread element.

3. The method of claim 2, wherein at least one of the protrusions is formed having a rounded cross-sectional form.

4. The method of claim 2, wherein the at least two protrusions extend different distances from the sole side.

5. The method of claim 1, wherein at least one of the protrusions is formed having a rounded cross-sectional form.

6. The method of claim 1, wherein the protrusions are formed having a height greater than 0.5 mm above the sole side of the tread body.

7. The method of claim 6, wherein the height of each of the plurality of protrusions extends up to about 5 mm from the sole side of the tread body.

8. The method of claim 7, wherein the height of each of the plurality of protrusions extends up to about 2.5 mm from the sole side of the tread body.

9. The method of claim 1, where the step of providing a tread layer for a tire includes molding the tread layer in mold, the mold comprising:
   a first side of the mold having a tread-forming surface;
   a second side of the mold having a sole-forming surface;
   wherein the width of the tread-forming surface is narrower than the width of the sole-forming surface;
   wherein the second side of the mold comprises a plurality of mold elements extending from the sole-forming surface toward the first side of the mold to form the plurality of recessed tread elements;
   wherein the second side of the mold has a plurality of recesses in the sole-forming surface to form the plurality of protrusions, the molding elements each abutting at least one of the recesses.

10. The method of claim 9, wherein the at least one recess of the mold extends generally the length of the at least one mold element.

11. The method of claim 9, wherein the at least one recess of the mold extends less than the length of the at least one mold element.

12. The method of claim 9, wherein the at least one recess of the mold generally is formed having a cross-section in the form of a quadrant of a circle.

13. The method of claim 9, wherein the at least one recess comprises a pair of recesses in the sole-forming surface each abutting one of a pair of opposing sides of the at least one mold element.

* * * * *